US011162713B2

(12) United States Patent
Garvey et al.

(10) Patent No.: US 11,162,713 B2
(45) Date of Patent: Nov. 2, 2021

(54) LIGHT CONCENTRATOR SYSTEM FOR PRECISION THERMAL PROCESSES

(71) Applicant: Blueshift, LLC, Broomfield, CO (US)

(72) Inventors: Ryan Garvey, Boulder, CO (US); Andrew Timon Brewer, Wheat Ridge, CO (US)

(73) Assignee: Blueshift, LLC, Broomfield, CO (US)

( * ) Notice: Subject to any disclaimer, the term of this patent is extended or adjusted under 35 U.S.C. 154(b) by 48 days.

(21) Appl. No.: 16/711,566

(22) Filed: Dec. 12, 2019

(65) Prior Publication Data
US 2020/0191443 A1 Jun. 18, 2020

Related U.S. Application Data

(60) Provisional application No. 62/780,458, filed on Dec. 17, 2018.

(51) Int. Cl.
*F24S 20/30* (2018.01)
*F24S 90/00* (2018.01)
(Continued)

(52) U.S. Cl.
CPC .............. *F24S 20/30* (2018.05); *F24S 23/71* (2018.05); *F24S 23/79* (2018.05); *F24S 30/458* (2018.05); *F24S 90/00* (2018.05); *G02B 7/183* (2013.01)

(58) Field of Classification Search
CPC ................................ F24S 30/45; H02S 20/32
See application file for complete search history.

(56) References Cited

U.S. PATENT DOCUMENTS 3,215,391 A * 11/1965 Storm .................. F16M 11/046
248/396
4,139,286 A * 2/1979 Hein ....................... F24S 23/79
353/3
(Continued)

FOREIGN PATENT DOCUMENTS

CA 2632853 11/2008

OTHER PUBLICATIONS

Fateri, M., et al., "Solar Sintering for Additive Manufacturing on the Moon", European Planetary Science Congress, 2017, 2 pages, vol. 11, EPSC2017-475-I,Europe.
(Continued)

*Primary Examiner* — Avinash A Savani
*Assistant Examiner* — Deepak A Deean
(74) *Attorney, Agent, or Firm* — Trenner Law Firm, LLC; Mark D. Trenner

(57) ABSTRACT

An example light concentrator system for precision thermal processes includes a stabilizing base and a structure attached to the stabilizing base. The structure includes support arms. An azimuth control rotates the structure. A primary solar collector on the support arms is rotatable about two axes based on various positions of the sun throughout the day. Elevation actuators adjust an angle of the primary solar collector relative to position of the sun. Collector distancing actuators adjust distance of the primary solar collector toward and away from the sun. A variety of Thermal Processing Units (TPUs) are configured for a specific process or set of processes implementing concentrated solar energy from the primary solar collector at the receiver plane. Position of the spot can be moved on a fixed receiver plane through translation of the lens relative to the support arms or through rotation of a redirecting mirror.

19 Claims, 17 Drawing Sheets

(51) Int. Cl.
*F24S 23/79* (2018.01)
*F24S 30/458* (2018.01)
*F24S 23/71* (2018.01)
*G02B 7/183* (2021.01)

(56) References Cited

U.S. PATENT DOCUMENTS

| | | | |
|---|---|---|---|
| 4,242,580 A | 12/1980 | Kaplow et al. | |
| 4,397,152 A | 8/1983 | Smith | |
| 4,411,490 A | 10/1983 | Daniel | |
| 4,491,125 A * | 1/1985 | Sainsbury | F24S 50/20 |
| | | | 126/578 |
| 4,529,830 A | 7/1985 | Daniel | |
| 4,653,472 A | 3/1987 | Mori | |
| 4,798,949 A * | 1/1989 | Wilcox | G01S 3/786 |
| | | | 250/203.6 |
| 5,540,216 A | 7/1996 | Rasmussen | |
| 5,862,799 A * | 1/1999 | Yogev | F24S 23/79 |
| | | | 126/578 |
| 6,691,701 B1 | 2/2004 | Roth | |
| 8,459,865 B1 | 6/2013 | Andraka et al. | |
| 8,689,784 B2 | 4/2014 | Monsebroten | |
| 9,039,213 B2 | 5/2015 | Winston et al. | |
| 9,201,228 B1 * | 12/2015 | Steinmeyer | F24S 23/31 |
| 9,739,505 B1 * | 8/2017 | Anich | F24S 25/70 |
| 10,240,574 B1 * | 3/2019 | Anich | F03B 13/06 |
| 2003/0075213 A1 * | 4/2003 | Chen | H01L 31/0547 |
| | | | 136/246 |
| 2003/0137754 A1 | 7/2003 | Vasylyev et al. | |
| 2005/0046977 A1 | 3/2005 | Shifman | |
| 2008/0092877 A1 | 4/2008 | Monsebroten | |
| 2009/0114210 A1 * | 5/2009 | Guice | F24S 30/425 |
| | | | 126/569 |
| 2009/0114280 A1 | 5/2009 | Jensen et al. | |
| 2009/0250052 A1 | 10/2009 | Gilon et al. | |
| 2011/0067687 A1 | 3/2011 | Raymond et al. | |
| 2011/0297229 A1 | 12/2011 | Gu et al. | |
| 2012/0132258 A1 * | 5/2012 | Albanese | G02B 27/0006 |
| | | | 136/248 |
| 2012/0192858 A1 * | 8/2012 | Oury | H01L 31/0547 |
| | | | 126/600 |
| 2013/0008430 A1 | 1/2013 | Lee | |
| 2013/0206135 A1 | 8/2013 | Ko et al. | |
| 2013/0341175 A1 | 12/2013 | Linden et al. | |
| 2015/0168019 A1 | 6/2015 | Kim | |
| 2017/0152176 A1 * | 6/2017 | Behnisch | C04B 20/026 |
| 2019/0346177 A1 * | 11/2019 | Jafarian | C01B 3/042 |
| 2020/0180961 A1 * | 6/2020 | Gracia Caroca | F24S 23/30 |

OTHER PUBLICATIONS

Imhof, Barbara, et al., "Advancing Solar Sintering for Building a Base on the Moon", 69th International Astronautical Congress, Sep. 25-29, 2017, 17 pages, IAC-17, C2.9.13, x37414, Australia.

Brewer, Andrew and Garvey, Ryan, PhD, Concentrated Solar Energy for Manufacturing In Space Powerpoint presentation, Blueshift, Jun. 12, 2018, 1 pg., Broomfield, Colorado.

Screenshots of video: https://vimeo.com/25401444, Markus Kayser—Solar Sinter Project, 2011, 12 pages.

Kayser, M. (2011), "Solar Sinter. Royal College of Art" available online at https://kayserworks.com/#/798817030644/.

* cited by examiner

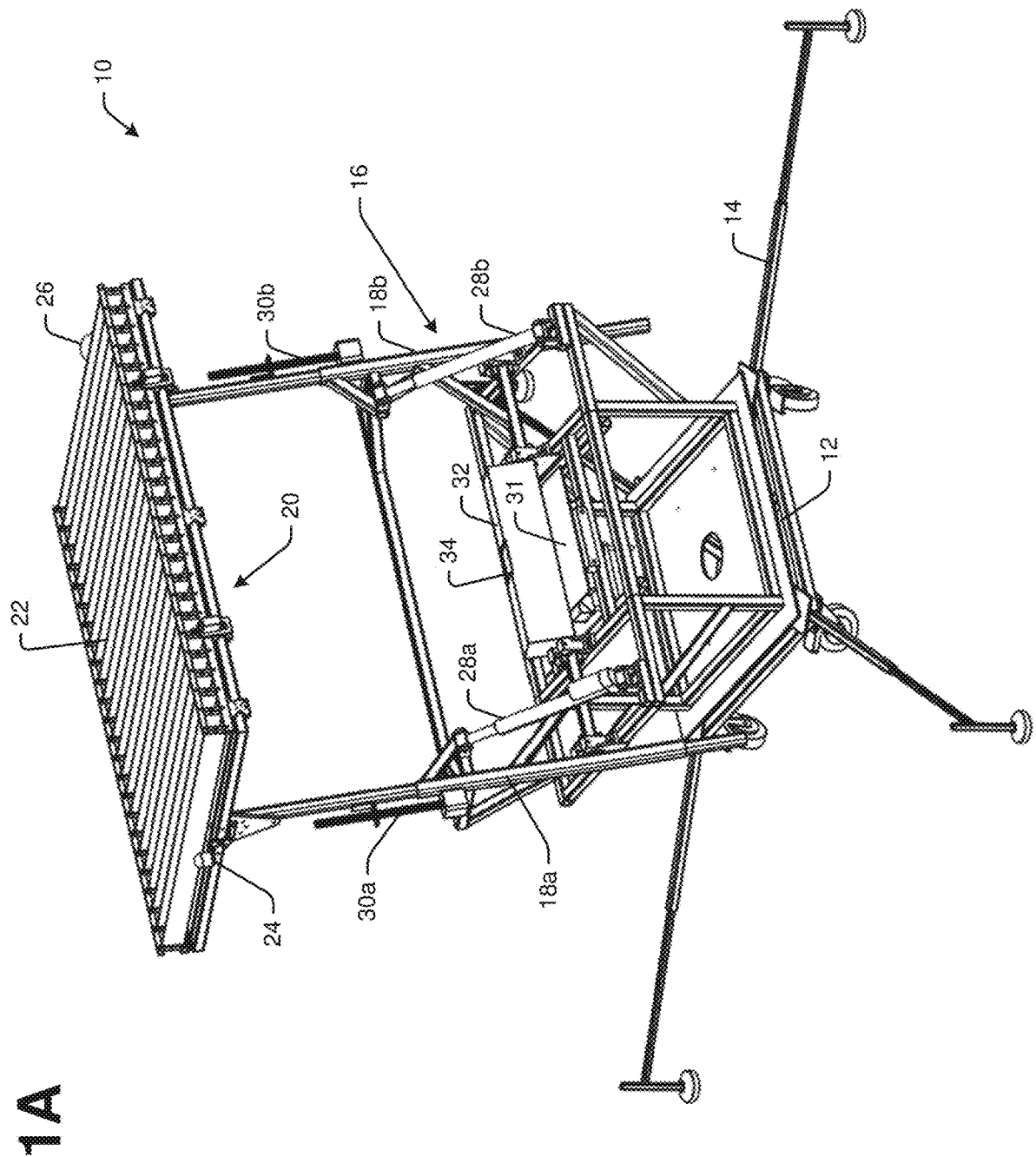

LIGHT CONCENTRATOR SYSTEM FOR PRECISION THERMAL PROCESSES

CROSS-REFERENCE TO RELATED APPLICATION

This application claims the priority benefit of U.S. Provisional Patent Application No. 62/780,458 filed Dec. 17, 2018 titled "Light Concentrator System For Precision Thermal Processes" of Garvey, et al., hereby incorporated by reference as though fully set forth herein.

BACKGROUND

Precision control over concentrated solar energy has been addressed in large-scale facilities with heliostat mirrors directing light onto a central secondary concentrator, which then passes through a louvre shutter system to control total power delivered to a solar furnace. Extremely high light concentration ratios are attainable through these stationary facilities, such as the largest solar furnace in the world, which can reach temperatures of 3,500° C.

Technologies are available related to two-axis solar tracking, solar concentration to high light concentration ratios to drive high temperature thermal processes, and secondary concentrating optics. However, these systems have not delivered consistent temperatures, thermal spot sizes, or solar flux densities to the receiver or to material along a receiver plane.

BRIEF DESCRIPTION OF THE DRAWINGS

FIG. 1A is a perspective view of an example light concentrator system for precision thermal processes.

DETAILED DESCRIPTION

Figure 1B:
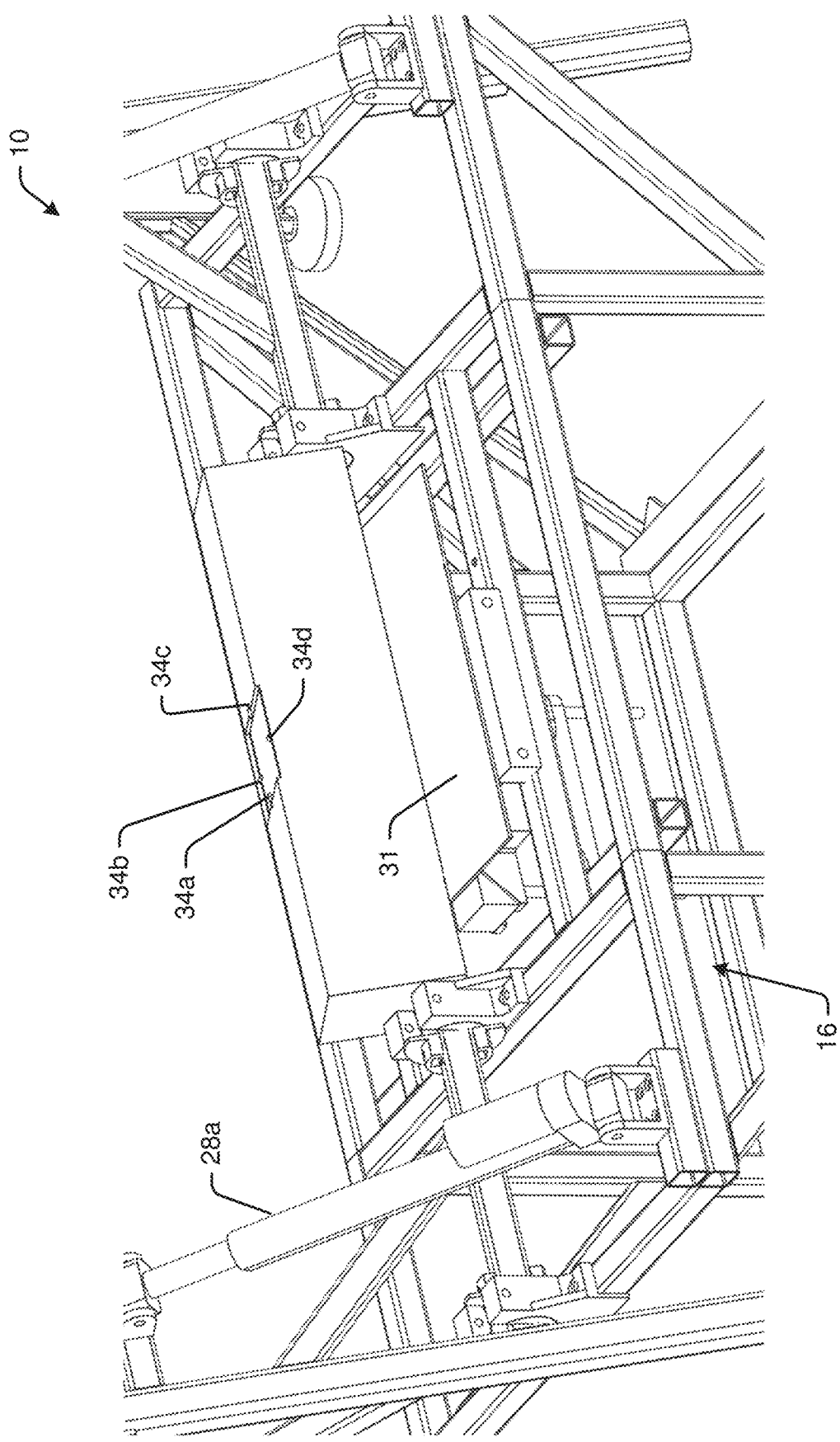
FIG. 1B is a close-up view of photodiodes for fine solar tracking and/or spot positioning of an example light concentrator system for precision thermal processes.

There exists a significant and unmet need for individuals, companies, and research institutions to achieve controlled, high temperatures up to 2,200° C. at reasonable costs using concentrated solar energy (CSE). A solar concentration system capable of consistently delivering high temperatures to a user defined process can promote CSE applications related to additive manufacturing, materials processing, infrastructure development, and fundamental research. Such a system may be of particular benefit to individuals, small companies, and underserved communities who do not have the resources necessary to meet the high equipment costs and heavy infrastructure requirements for achieving controlled high temperatures using existing methods that require expensive furnaces and high electricity or fuel costs.

A system and method is disclosed to consistently heat a receiver material to specific temperatures (e.g., in the range of 65° C. to 2,200° C.) for long durations (e.g., 6 or more hours) with minimal equipment and operating costs. The technology is based on concentrated solar energy as the heat source, and includes a feedback and control system for maintaining temperatures, total energy, energy flux density, and thermal spot size delivered to a receiver plane.

In an example, the system and method disclosed herein addresses the limitations of existing techniques for concentrating solar energy, which lack temperature control and consistency of output thermal flux, which varies with time of day, sun position, cloud cover, and atmospheric conditions. The system disclosed herein produces high temperatures for precision thermal processes, has very low operating and capital costs, is lightweight and mobile, can scale from handheld to industrial sizes, and can be operated in remote environments without access to a developed energy infrastructure.

In an example, the system enables a wide variety of thermal processes such as welding, cooking, waste processing, and water desalination to be performed using sustainable solar energy without the efficiency losses associated with converting to electrical power first. The system may sufficiently reduce the cost of producing high temperatures with fine resolution in a controlled machine environment to enable low-cost, hobbyist-grade multi-material (e.g., glass and metal) 3D printers. The system also has characteristics (e.g., lightweight, energy efficient heating) that make it well suited for use in space and on foreign bodies such as the Moon for 3D printing using local resources such as regolith (i.e., soil).

In an example, linear actuation of the primary collector relative to the receiver provides fine temperature control at the receiver by adjusting energy flux density of the concentrated spot. Linear actuation of the primary collector can be coupled with rotation of a redirecting mirror to beam a concentrated solar spot onto different locations of a planar surface or along a 2D path while independently controlling energy flux density of the concentrated solar spot.

In an example, the geometry of the compound parabolic concentrator implemented as a secondary concentrator may be configured such that its geometry redirects light from an inclined solar elevation to an angle normal to a receiver surface or some optimal angle relative to the receiver.

In an example, a ring of sensors for measuring solar flux can be arranged around the concentrated solar beam near the receiver to drive precision two-axis tracking of the sun, and maintain the position of the concentrated spot at a location on the receiver. The ring of sensors can be configured to convert light cast outside of the intended receiver area to electrical or mechanical power to drive the two-axis rotation of the primary collector.

In an example, the system and method can be provided as the heat source for additive manufacturing and other precision thermal processes. The system can be mounted on a mobile carriage to allow even greater translations of the concentrated solar spot such as the in situ heat treatment of a large surface or additive manufacturing of buildings and structures.

In an example, the shutter on the primary collector can be operated to regulate output solar flux throughout the day and provide gross temperature control. The orifice plate/mechanical iris provides high resolution spot size control when used both in conjunction with a compound parabolic concentrator and without a compound parabolic concentrator when adjusting temperature of receiver by changing the distance between the primary collector and receiver.

Compared to the currently available solar-based additive manufacturing systems, the proposed solar additive manufacturing method is capable of producing higher temperatures and smaller spot sizes with precision control for producing high resolution parts with greater bond strength and material density through full melting of the base feedstock.

There is no commercially available solar concentrator that provides user selectable temperature and spot size control or temperature regulation over extended periods. Many of the uses of this technology relate to additive manufacturing on other planetary bodies such as the Moon.

Before continuing, it is noted that as used herein, the terms "includes" and "including" mean, but is not limited to, "includes" or "including" and "includes at least" or "including at least." The term "based on" means "based on" and "based at least in part on."

The systems and operations shown and described herein are provided to illustrate example implementations. It is noted that the systems operations are not limited to the examples shown and described. Still other systems operations may also be implemented by those having ordinary skill in the art after becoming familiar with the teachings herein.

FIG. 1A is a perspective view of an example light concentrator system 10 for precision thermal processes. In an example, the system 10 provides two-axis tracking of the sun and concentrating direct radiation onto a receiver or receiver plane to produce high temperatures. The system 10 may include a primary solar collector (e.g., a Fresnel lens or other concentrating lens or parabolic reflector). The primary collector rotates about two axes to track the sun throughout the day. A shutter mechanism is placed before or after the primary collector to control aperture size and total flux (power output). An irradiance sensor measures direct irradiance of incoming sunlight to inform the adjustments of the shutter and maintain consistent power output independent of cloud cover, solar elevation, or other atmospheric effects. The concentrated beam of sunlight coming from the primary collector is reflected off of an optional mirror for redirecting the beam onto a receiver or into a secondary concentrator at a more optimal angle such as with a low angle of incidence. The rotation of the mirror can be mechanically or electronically linked to the rotation of the primary collector or independently operated.

An example of the system 10 includes a mobile platform or base 12 with stabilizing outrigger 14 (e.g., four legs are shown but other examples are contemplated). A structure 16 is attached to the base 12. An azimuth control (e.g., motor and linkage, not shown) may be provided for rotating the base 12 and/or structure 16.

The structure may include support arms 18a, 18b and corresponding linkage. The support arms 18a, 18b support a primary collector or solar lens 20 (FIG. 3) under a louver shutter 22. In another example, the shutter need not be a louver and can be any suitable shutter (e.g., sliding shutter (s)). The primary collector (e.g., a Fresnel lens) concentrates sunlight. A pyranometer 24 may be provided on the support structure. Pyranometer 24 measures solar irradiance on a planar surface and is designed to measure the solar radiation flux density from the hemisphere above. An approximate solar tracker 26 may also be provided on the support structure.

In an example, the support arms 18a, 18b may be operated by solar elevation actuators 28a, 28b (e.g., motors and associated linkage), to adjust the angle of the solar lens 20 relative to the position of the sun. The support arms 18a, 18b may also be operated by collector distancing actuators 30a, 30b, to adjust the distance of the solar lens 20 toward and away from the sun.

A receiver plane (e.g., workspace) 31 is also shown in FIG. 1 having a safety enclosure 32 and photodiodes 34. In an example, the safety enclosure 32 is opaque. It is noted that the workspace or working surface 31 may be mounted to the surrounding structure by thermal isolation mounts.

FIG. 1B is a close-up view of four photodiodes 34a-d. The photodiodes 34a-d are provided for fine solar tracking and/or spot positioning on the workspace.

Figure 2:
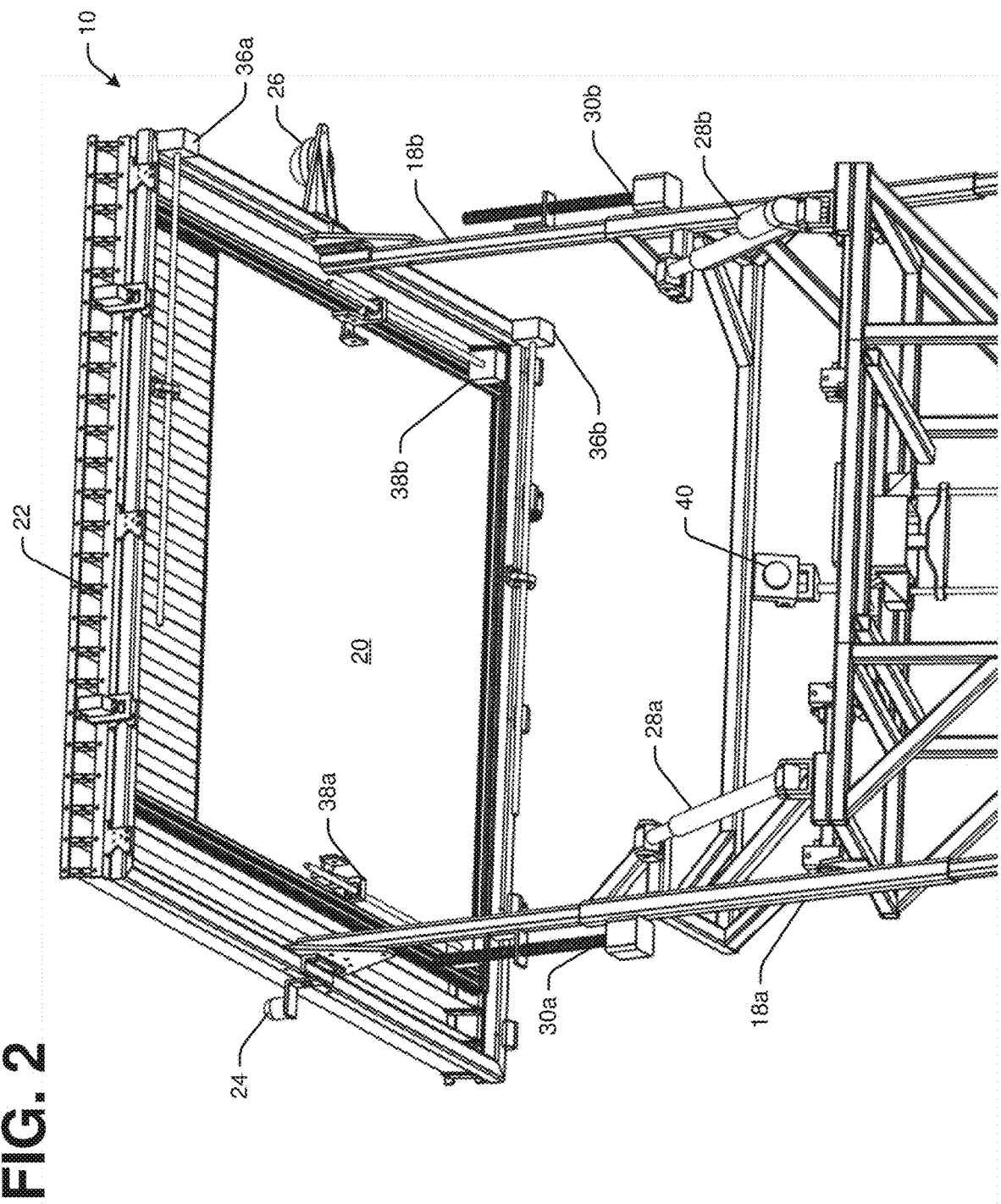
FIG. 2 is a perspective view showing a translating lens of an example light concentrator system for precision thermal processes.

FIG. 2 is a perspective view showing a translating lens 20 of the example light concentrator system 10. Horizontal actuators 36a, 36b (e.g., electric motor and associated linkages) may be provided to move the lens left and right within the frame. Horizontal actuators 38a, 38b (e.g., electric motor and associated linkages) may be provided to move the lens up and down within the frame. It is noted that left-right and up-down lens actuation may be coupled with lens distance to receiver actuator to maintain a spot in focus while translating across a surface. A fixed camera 40 may be provided to monitor spot and position size.

Figure 3:
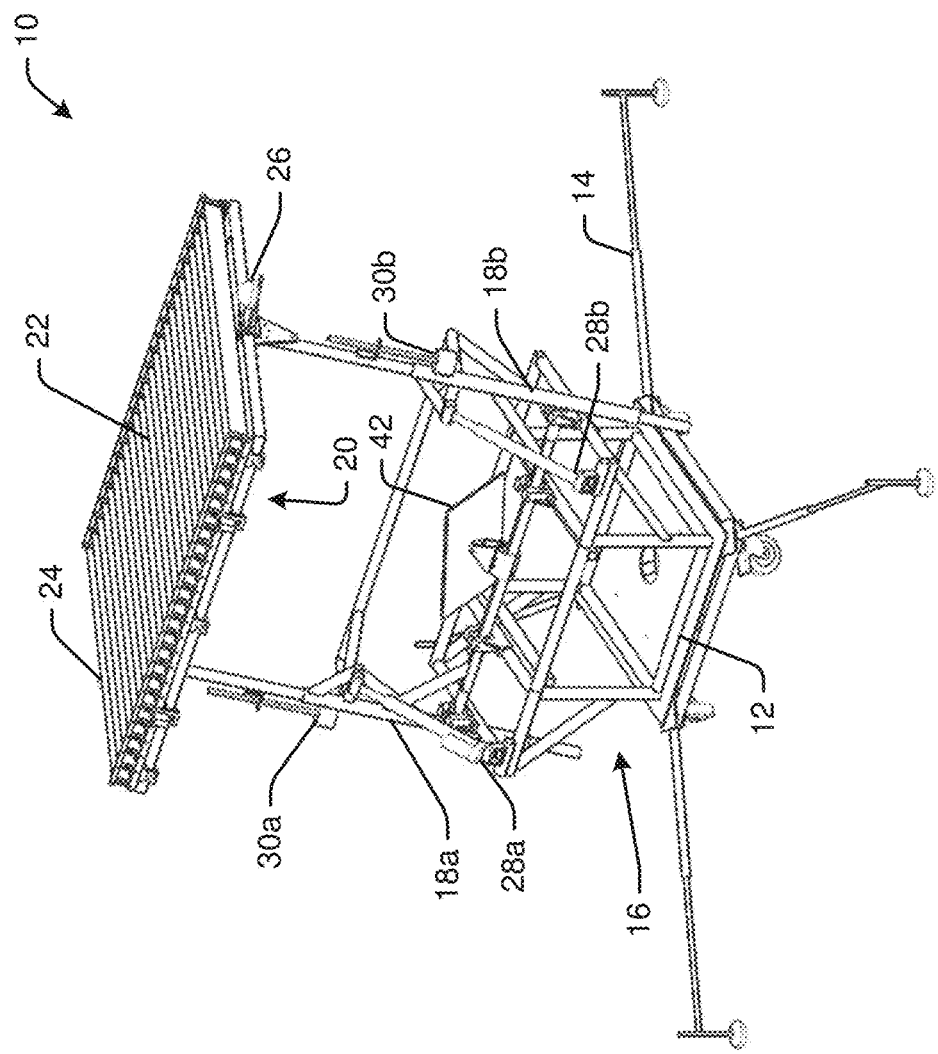
FIG. 3 is a perspective view showing a redirecting mirror of an example light concentrator system for precision thermal processes.

FIG. 3 is a perspective view showing a redirecting mirror 42 of an example light concentrator system 10. In an example, the redirecting mirror 42 is rotatable about two axes. The redirecting mirror 42 rotates to translate the concentrated spot across a fixed receiver plane. The redirecting mirror 42 may be coupled with the lens distancing actuators 30a, 30b, to maintain the spot in focus on the receiver.

In an example, the light concentrator system 10 may be implemented for concentrating solar energy to very high light concentration ratios and controlling total power output, energy flux density at a receiver, spot size of concentrated light, and/or position of the irradiated spot on a receiver plane. The configuration of optical lenses and redirecting mirrors increases uniformity of the energy flux density profile to be projected onto the receiver.

The Solar Concentrator Unit (SCU) of the system 10 may be implemented with a variety of different Thermal Processing Units (TPUs). Each type of TPU may be configured for a specific process or set of processes. In an example, the TPUs may be implemented on or near workspace 31. Example TPUs will now be described below with reference to FIGS. 5-10.

Figure 4:
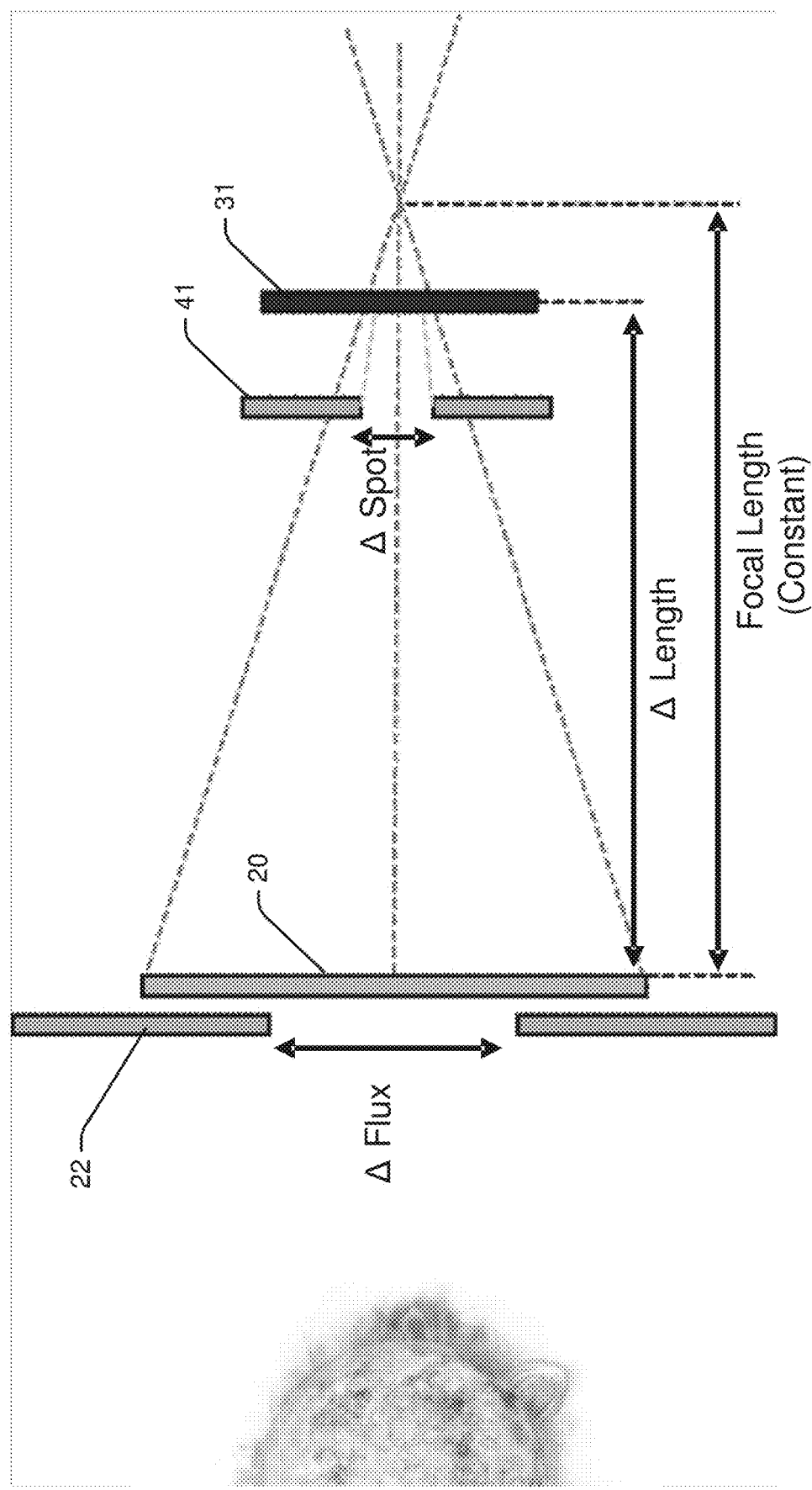
FIG. 4 is an illustration of thermal control mechanisms with an example light concentrator system for precision thermal processes.

FIG. 4 is an illustration of thermal control mechanisms with an example light concentrator system 10. In this illustration, flux (delta Flux) is variable by changing the amount of light on the primary solar concentrator 20 via shutters 22. The spot size (delta Spot) is variable by changing the size opening (or orifice or mechanical iris) in a plate 41 adjacent the receiver plane 31. The focal length (distance from the primary solar concentrator 20 to the focal point) is constant. But the temperature and flux at the receiver plane 31 can be adjusted by changing the distance (delta Length) between the primary solar concentrator 20 and the receiver plane 31.

Figure 5:
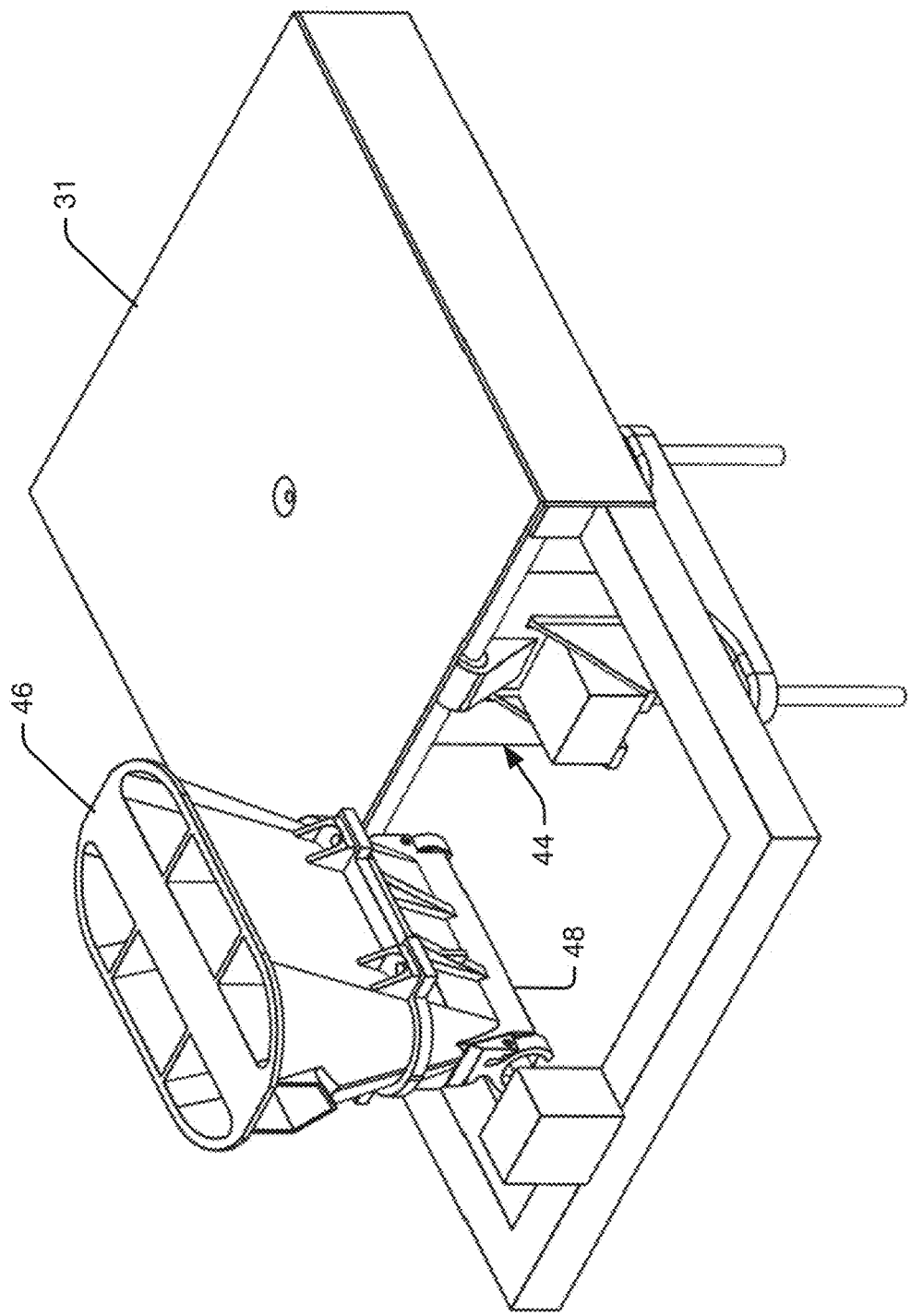
FIG. 5 is a perspective view showing a powderbed, powder feedstock dispenser, and powder feed roller of an example light concentrator system for precision thermal processes.

FIG. 5 is a perspective view showing an example TPU including a powderbed 44, powder feedstock dispenser 46, and powder feed roller 48 which may be implemented for an example light concentrator system 10 for workspace 31.

Figure 6:
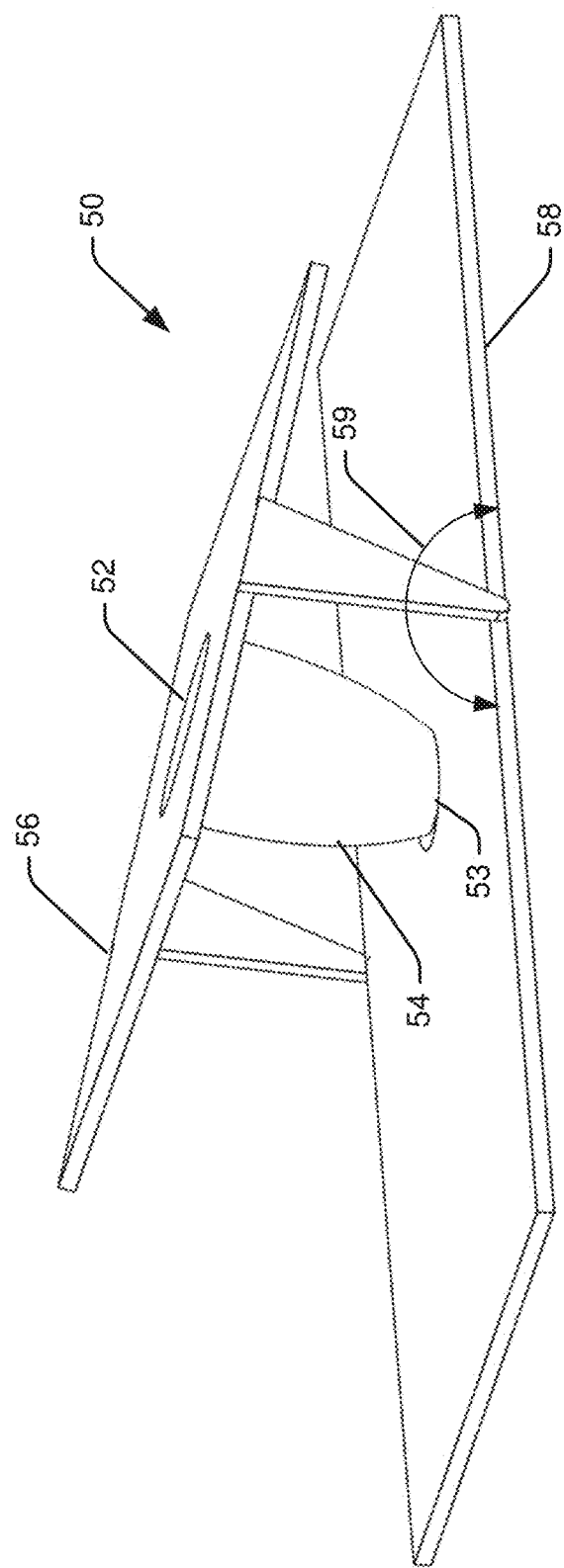
FIG. 6 is a perspective view showing an example secondary concentrator including a compound parabolic concentrator (CPC) which may be implemented for an example light concentrator system.

FIG. 6 is a perspective view showing an example secondary concentrator 60 including a compound parabolic concentrator (CPC) 54 which may be implemented for an example light concentrator system 10. The CPC 54 includes an inlet 52 and an outlet 53. The CPC 54 is mounted on a mount 56 rotatably attached to a fixed plate 58 for rotation, e.g., as indicated by arrows 59.

Figure 7:
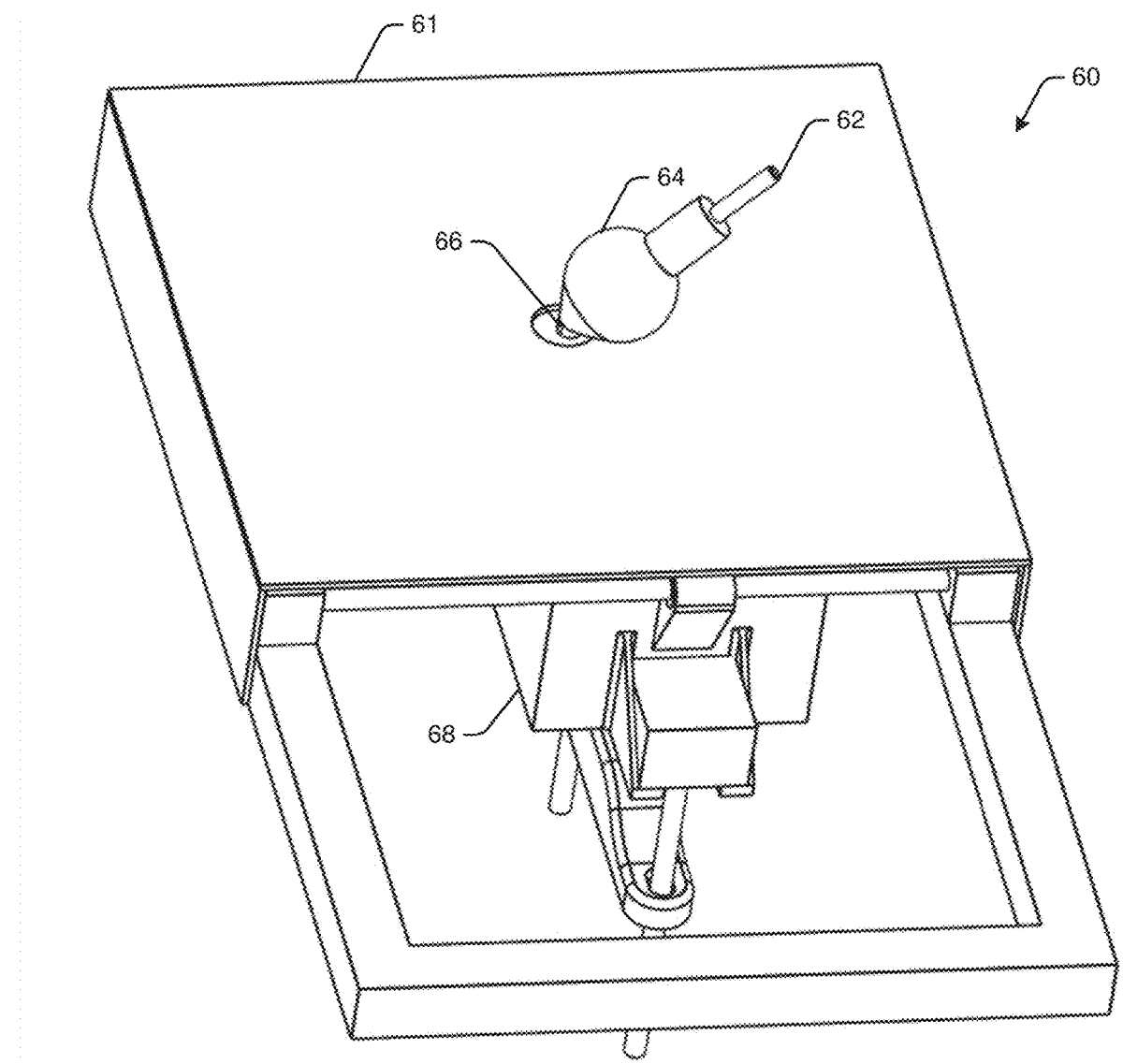
FIG. 7 is a perspective view showing a fused deposition modeling nozzle of an example light concentrator system for precision thermal processes.

FIG. 7 is a perspective view showing an example TPU including a fused deposition modeling nozzle 60 which may be implemented for an example light concentrator system 10. A fused deposition modeling nozzle is a heated nozzle for extrusion of melted material. In an example, the fused deposition modeling nozzle 60 may be provided on workspace or build chamber 61. The build chamber 61 may be totally or partially enclosed. The fused deposition modeling nozzle 60 may include a rod or filament 62 fed through a heated solar receiver 64 and extruder nozzle 66. The build chamber 61 may include a 3D (three-dimensional) translating build plate 68.

Figure 8:
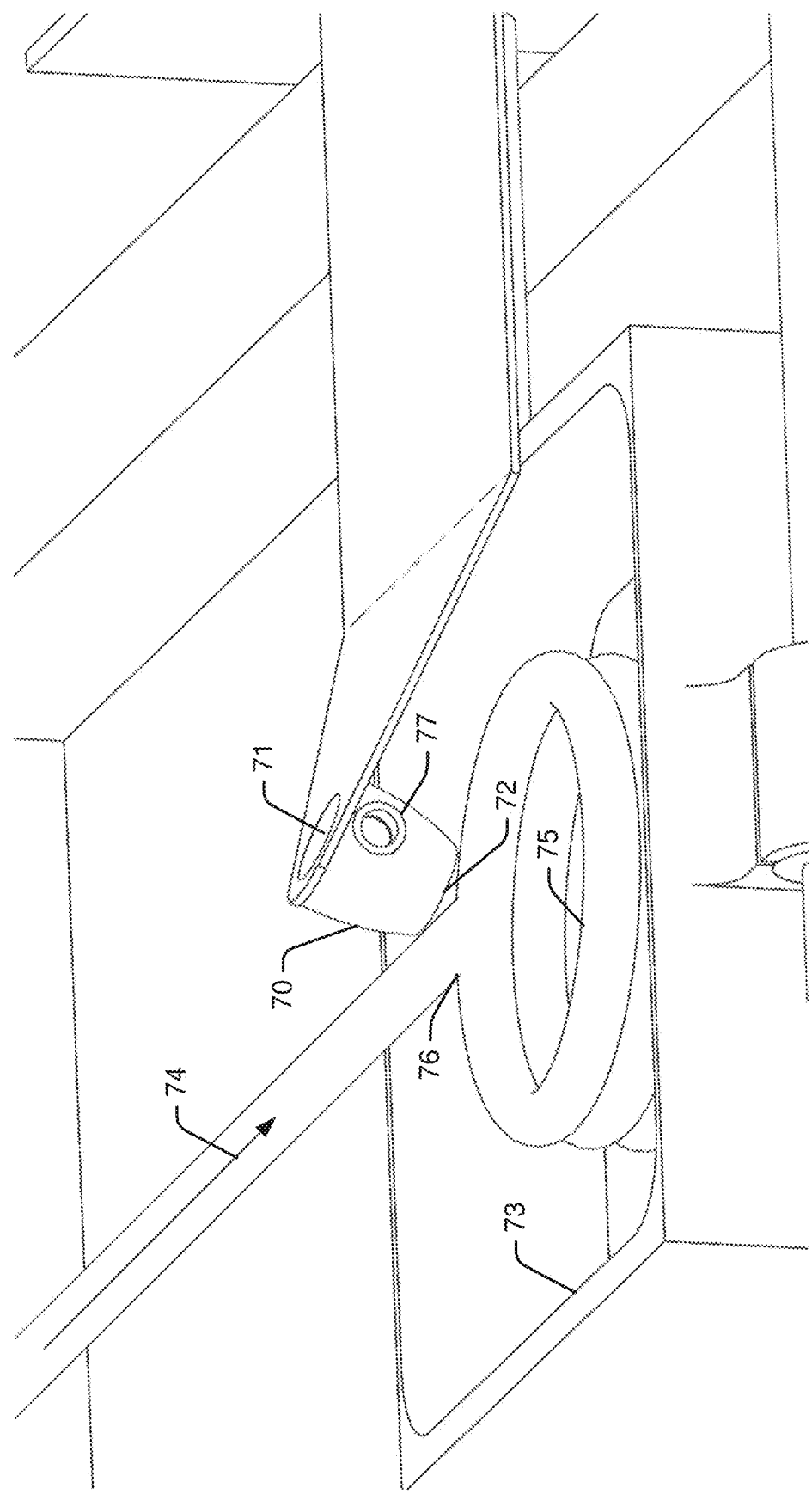
FIG. 8 is a perspective view illustrating directed energy deposition of feedstock by an example light concentrator system for precision thermal processes.

FIG. 8 is a perspective view of an example TPU illustrating directed energy deposition of metal wire or glass rod feedstock by the example light concentrator system 10 to a 3D printed part 75. In this illustration, light is directed through the inlet end 71 of annular collar 70 and out of outlet end 72 into the annealing chamber 73. Annular collar 70 may include a shielding gas inlet 77. Visible in FIG. 8 is the rod or filament feed direction 74, and molten zone 76.

Figure 9:
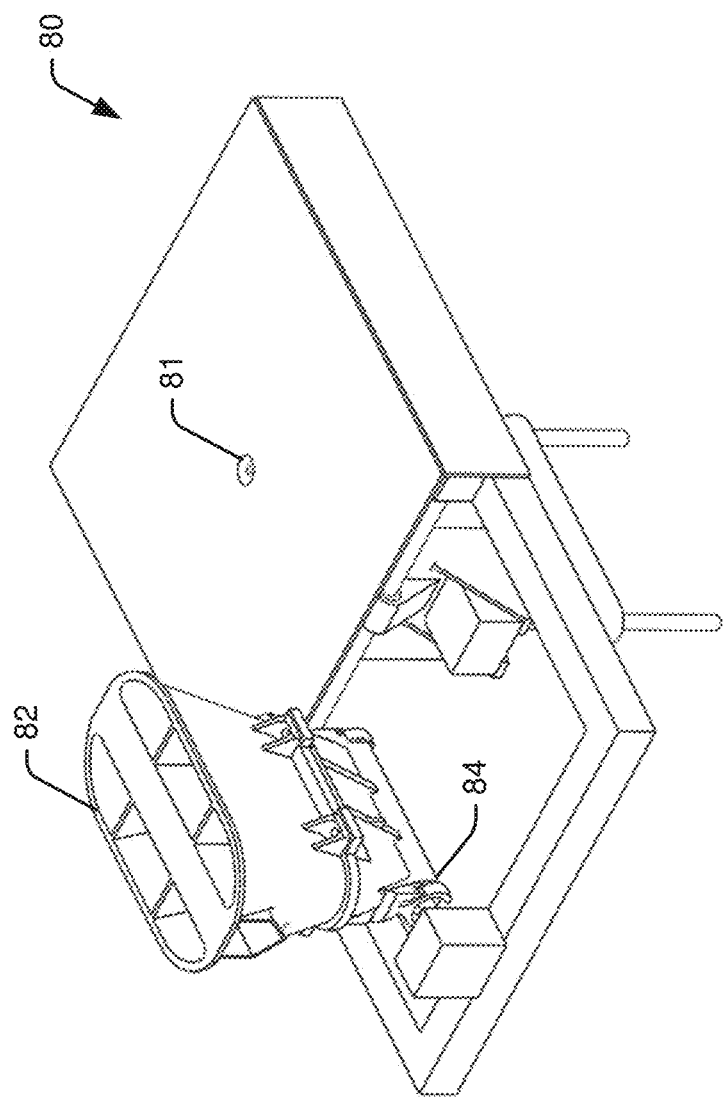
FIG. 9 is a perspective view showing a translating powderbed of an example light concentrator system for precision thermal processes.

FIG. 9 is a perspective view of an example TPU including a translating powderbed 80 of an example light concentrator system 10. The example translating powderbed 80 includes a powder hopper 82 and a powder feed roller 84. The example translating powderbed 80 may be implemented for selective sintering or selective melting of a powder feedstock. In an example, thermocouples may be positioned concentrically around the orifice 81 for precision solar tracking.

Figure 10:
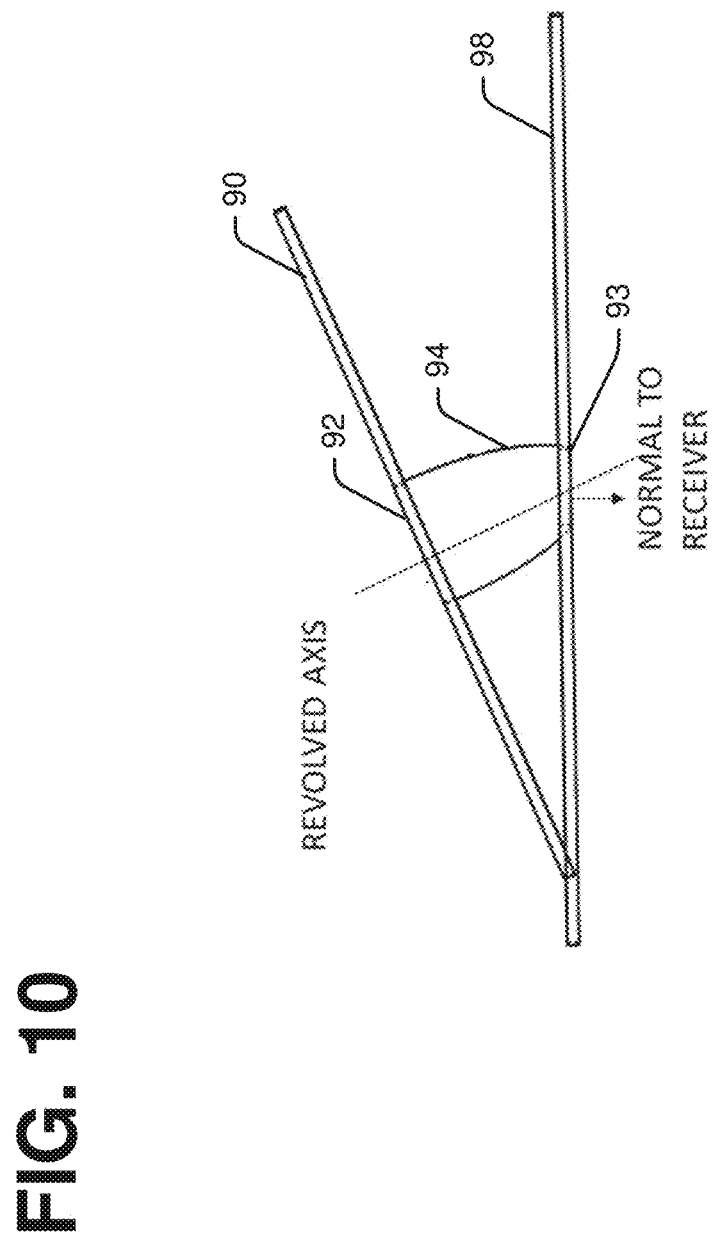
FIG. 10 is an illustration of an asymmetric CPC with fixed orientation relative to the solar elevation of an example light concentrator system for precision thermal processes.

FIG. 10 is an illustration of an example TPU including an asymmetric CPC 94 with fixed orientation relative to the solar elevation, which may be implemented for an example light concentrator system 10. The CPC 94 includes an inlet 92 and an outlet 93 of an asymmetric compound parabolic concentrator 94. The CPC 94 is mounted in a fixed orientation.

Figure 11:
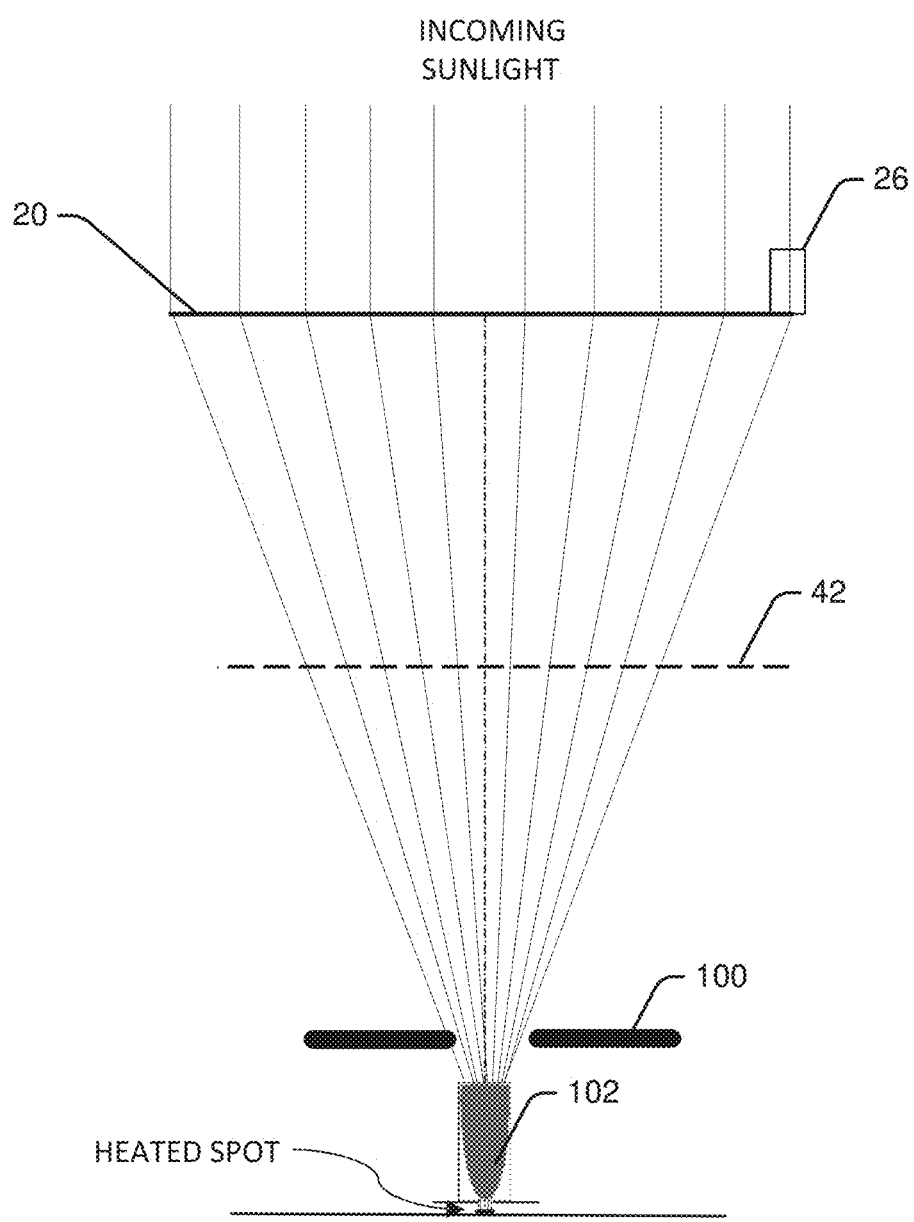
FIG. 11 is an illustration of an example light path of a light concentrator system for precision thermal processes.

FIG. 11 is an illustration of an example light path of a light concentrator system 10. Incoming sunlight enters through the primary collector (e.g., collector 20 in FIGS. 1 and 3) and is reflected on a redirecting mirror 42 and through a light sensor ring 100 and into the secondary concentrator 102, where it is directed through an orifice and onto a heated spot.

Figure 12:
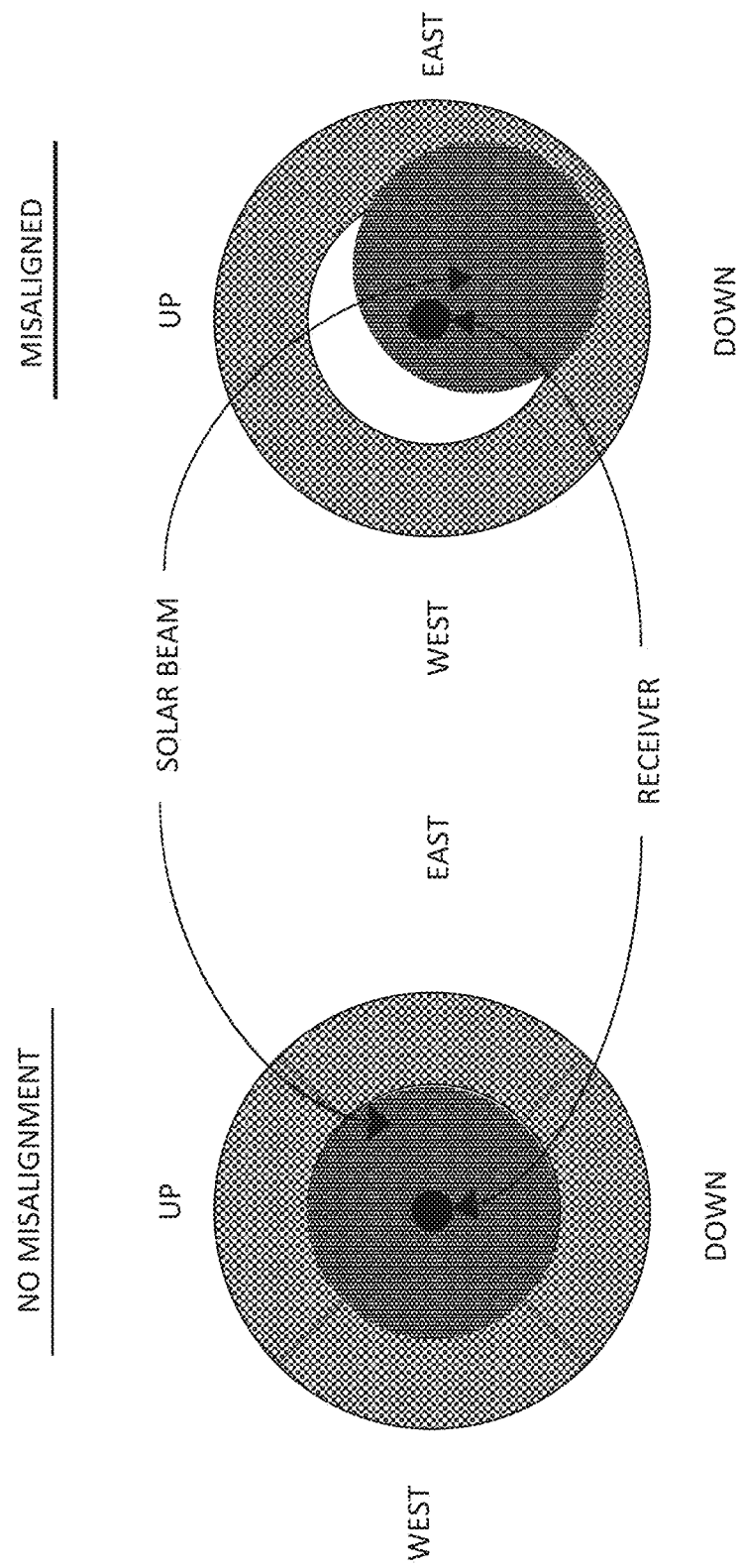
FIG. 12 is an illustration showing light sensor ring alignment of an example light concentrator system for precision thermal processes.

FIG. 12 is an illustration showing light sensor ring 100 alignment for the light path shown in FIG. 11 for example light concentrator system 10. The ring on the left has been properly aligned. The ring on the right is illustrated as being misaligned. The aligned ring on the left is desirable for most efficient heating.

Figure 13:
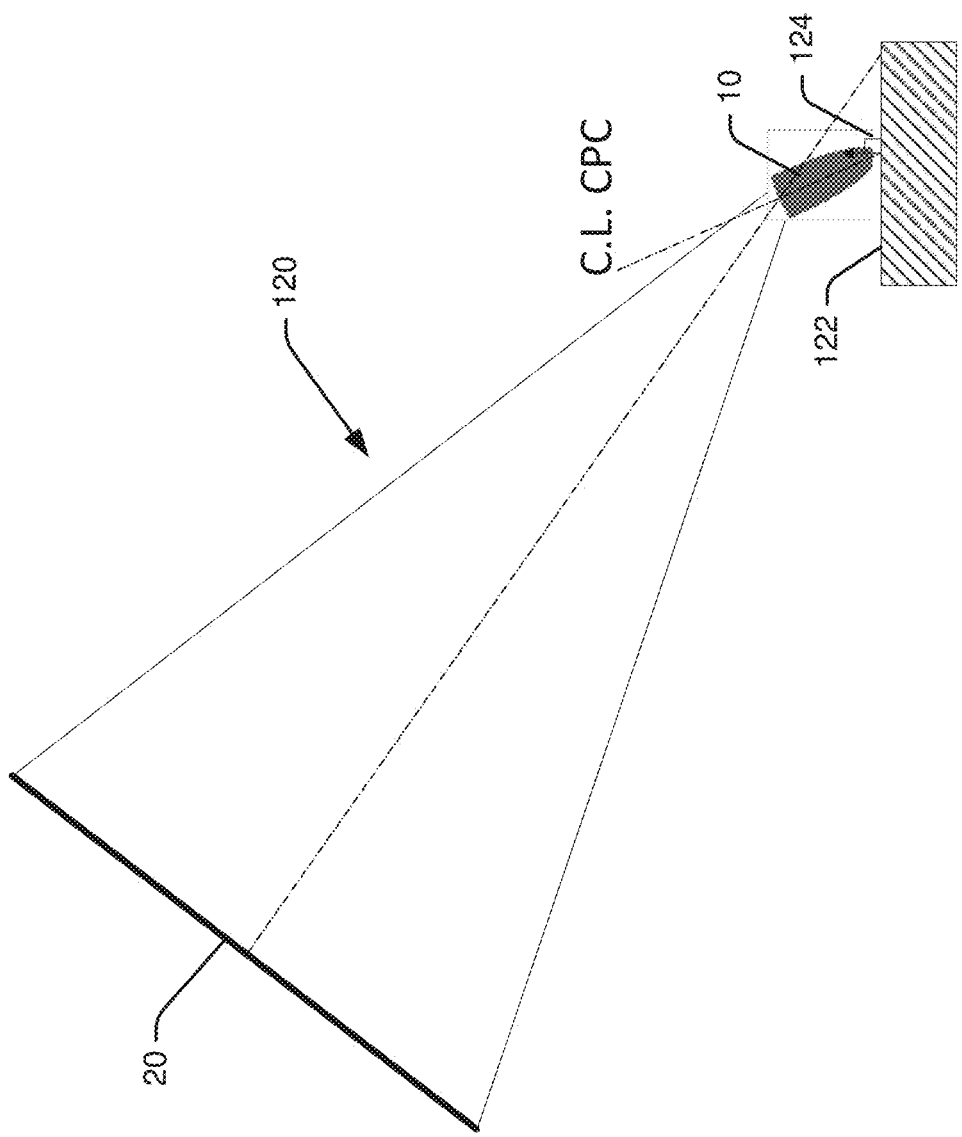
FIG. 13 is an illustration of modified geometry of a compound parabolic concentrator for lower solar elevations of an example light concentrator system for precision thermal processes.

FIG. 13 is an illustration of modified geometry of a compound parabolic concentrator 110 for lower solar elevations for the example light concentrator system 10. It is noted that the CPC centerline angle between beam 120 is redirected to be normal (90 degrees) to the receiver surface 122, as illustrated at 124 in this example. It is also noted that the CPC 110 outlet is parallel to the receiver surface 122 in this example.

Figure 14:
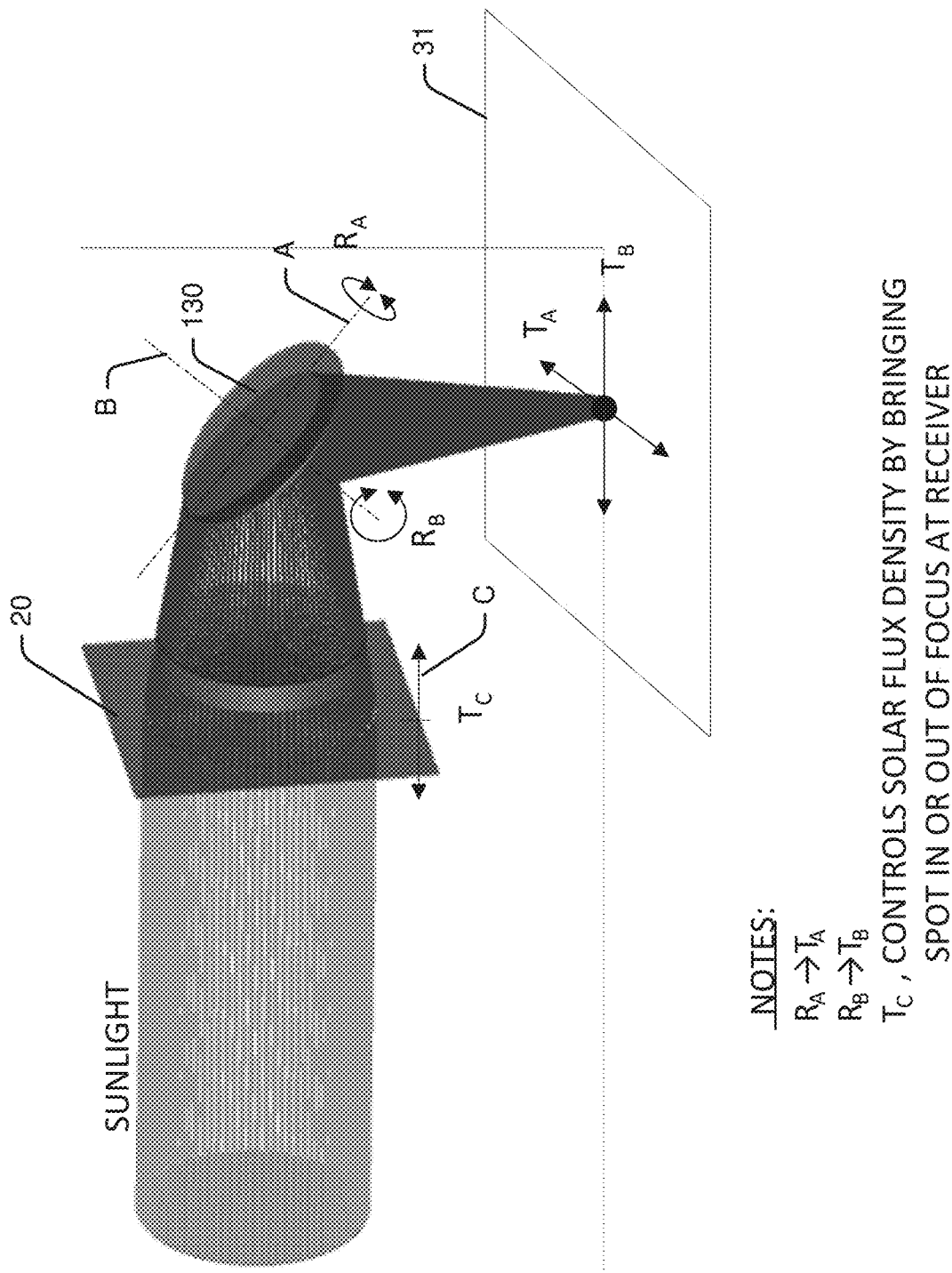
FIG. 14 is an illustration of a translating concentrated solar spot on a receiver surface by rotating a redirecting mirror of an example light concentrator system for precision thermal processes.

FIG. 14 is an illustration of a translating concentrated solar spot on a receiver surface by rotating a redirecting mirror 130 of an example light concentrator system 10. In this illustration, incoming sunlight passes through primary collector 20 and is directed by mirror 130 onto the receiver surface or workspace 31. $R_A$ indicates rotating the mirror about the A axis, and $R_B$ indicates rotating the mirror about the B axis. $T_C$ indicates translating the primary collector 20 along the C axis.

Figure 15:
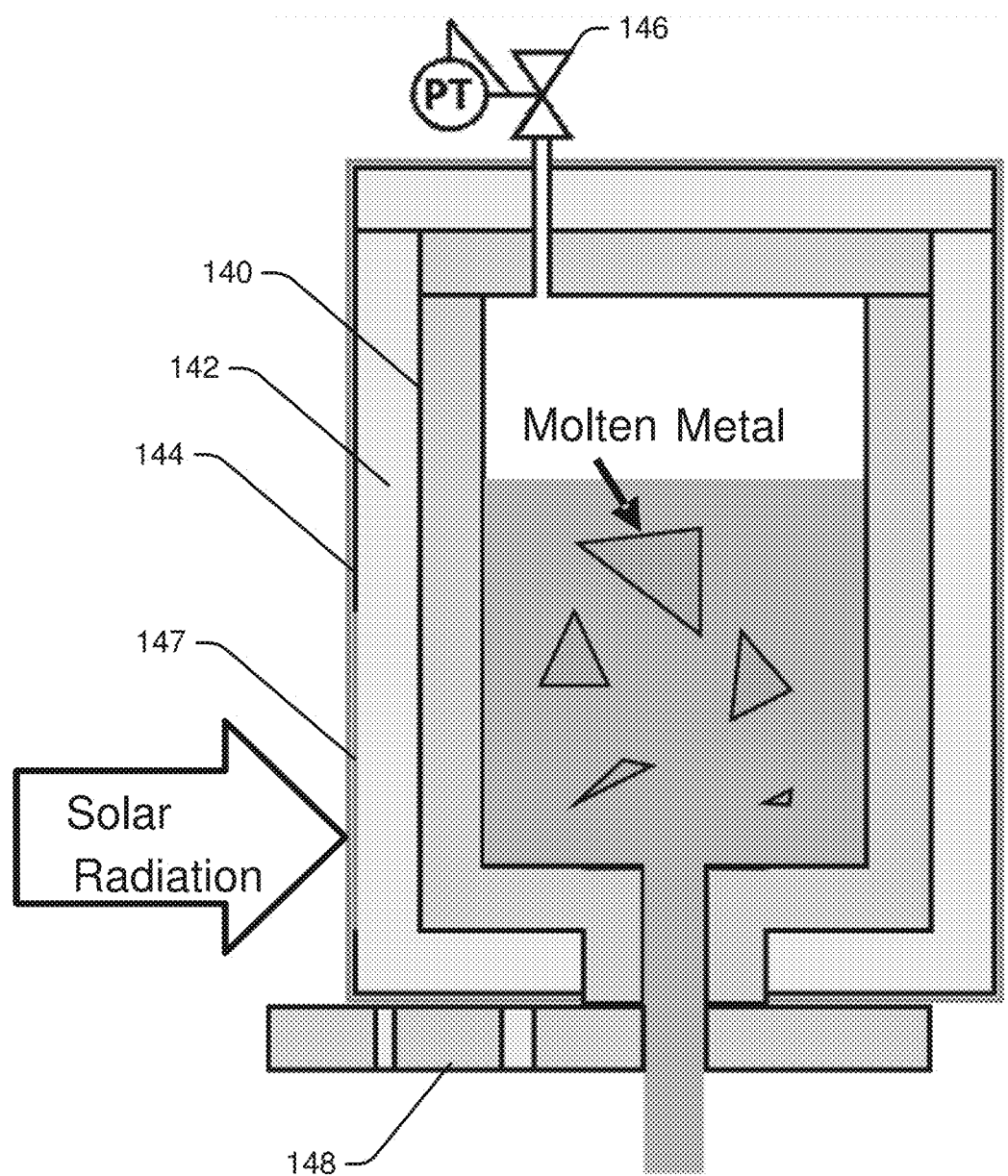
FIG. 15 is an illustration of integrating a concentrated solar beam for heating material in an additive manufacturing process by fused deposition with an example light concentrator system for precision thermal processes.

FIG. 15 is an illustration of integrating a concentrated solar beam for heating material in an additive manufacturing process by fused deposition with an example light concentrator system for precision thermal processes. In this illustration, a ceramic crucible 140 is provided within a vacuum 142 inside of an internally reflective glass outer wall 144, which permits solar radiation to pass through an inlet 147 and is reflected inward toward the molten metal. A pressure control valve 146 and sliding orifice plate 148 may be provided.

In an example, the collector lens is translated relative to the support arms to move position of the heated spot on the receiver plane with spot size independently controlled through linear actuation of the path distance between the lens and receiver.

Figure 16:
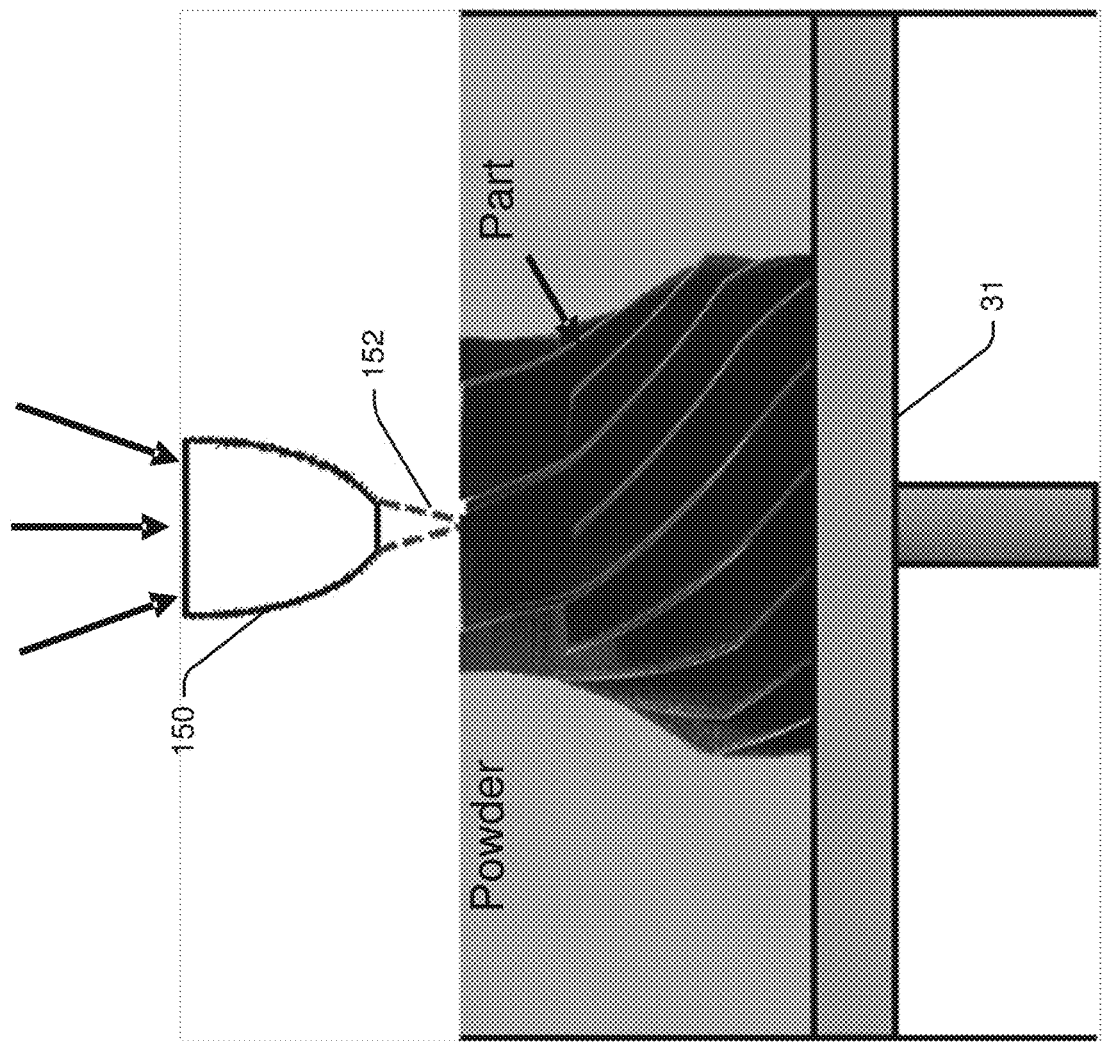
FIG. 16 is an illustration of integrating a concentrated solar beam for heating material in an additive manufacturing process by solar sintering and/or melting with an example light concentrator system for precision thermal processes.

FIG. 16 is an illustration of integrating a concentrated solar beam for heating material in an additive manufacturing process by selective solar sintering and/or melting with an example light concentrator system 10. In this illustration, a secondary concentrator 150 receives incoming concentrated solar energy and directs it to a spot 152 (e.g., having a diameter of about 2.5 mm) to heat a powder bed and form a part on receiving plane 31.

Other examples are also contemplated. By way of illustration, a compound parabolic concentrator or parabolic reflector may be provided for secondary concentration of light from the primary collector onto the receiver to achieve higher light concentration ratios and a smaller spot size while increasing uniformity of the solar flux density distribution profile.

A modified geometry of a compound parabolic concentrator for lower solar elevations can be configured such that its inlet is oriented at an angle suited for lower solar elevations while its outlet is oriented parallel to the receiver plane. Passive and/or active cooling mechanisms can be affixed to the secondary concentrator to reduce temperature of sensitive components. Some light is occluded by an orifice or mechanical iris immediately prior to the receiver to control the size of the projected spot on the receiver.

In an example, a ring of sensors for relative measurements of irradiance and/or temperature may be placed concentrically around the concentrated beam to sense any misalignment between the primary collector and the incoming direct radiation to reorient the primary collector towards the sun. The alignment sensor ring also provides supplemental two-axis solar tracking to the gross conventional tracking methods for improved alignment precision throughout the day.

In an example, photovoltaic cells or paraffin actuators may be provided as the irradiance sensors in the alignment ring to power the mechanical rotation of the primary collector to correct the misalignment and to further reduce electricity requirements.

In an example, sensors are placed on or near the receiver to measure irradiance at the receiver and/or temperature of the receiver material. The temperature of the receiver is controlled by linear actuators which perform micromotion adjustments to the path distance between the primary collector and the receiver. These dynamic adjustments to the distance between primary collector and receiver bring the concentrated spot either in or out of focus on the receiver plane and provide a method for controlling solar flux density of the concentrated spot and therefore the temperature of the receiver.

In an example, the receiver may be fixed in place rotated to redistribute the concentrated solar energy on its surface, or be moved about the heated spot such as in the case of a bed of powder with an exposed surface being irradiated and caused to melt in selective melting additive manufacturing. When controlling temperature in this way, the concentrated spot size is maintained and controlled using an orifice plate or mechanical iris prior to the receiver plane as mentioned previously.

In an example, a receiver surface may be rotated by translating a concentrated solar spot via a redirecting mirror about two axes, such that the concentrated spot is re-positioned on a receiver or caused to move along a 2D path across a receiver surface.

In another example, a receiver may be moved about a fixed hotspot to translate a concentrated solar spot. Linear actuation of the primary collector relative to the redirecting mirror can be coupled to the rotation of the redirecting mirror to allow control over the concentrated solar flux density while the spot is translated along a path on the receiver plane.

In an example, safety mechanisms and shields prevent the user from viewing the concentrated solar spot or coming into physical contact with the high temperatures produced by the concentrated light. Modular mounting components allow Thermal Processing Units to be fixed in place within the Solar Concentrator Units. Another embodiment of the technology is to mount the Solar Concentrator Unit on a mobile platform or gantry system to allow greater translations of the heated spot.

In an example, the solar concentrator unit uses sensors and control mechanisms to (1) precisely track the sun, (2) dynamically adjust solar flux density, (3) control total power output, (4) control temperature at the receiver, (5) adjust spot size, and (6) move a spot of concentrated sunlight across a fixed surface. Other examples are also contemplated.

In an example, interchangeable thermal processing units may be integrated into the solar concentrator unit to provide controlled heating for processes including but not limited to additive manufacturing (e.g., 3D printing); high temperature pyrolysis; heat treatment of metals including welding and cladding; recycling of waste material including the production of metal or glass feedstock from scrap; production of biochar from biomass; surface treatment of glass or paved structures; sanitizing medical equipment; desalination and water purification; educational demonstrations; and independent materials science research at very high temperatures.

In an example, the system 10 may be implemented as a multi-material additive manufacturing system capable of producing custom metal, glass, or mixed material parts. The system is lightweight, scalable, and energy efficient making it ideal for 3D printing on other planets and bodies in the Solar System using local resources such as regolith (i.e. soil).

In another example, the system may power 3D printing processes installed within the frame of the solar concentrator unit, or constructed as a standalone structure or device. 3D printing processes powered directly by the Solar Concentrator Unit include by way of illustration, but are not limited to, (1) selective sintering of powder (e.g. glass, metal alloys, crushed rock), (2) selective melting of powder and (3) fused deposition modeling by heating a vessel containing glass, metal, or other materials until the material is molten and can be extruded onto a build plate, and (4) directed energy deposition melting of a wire or filament as it is deposited onto 3D part. A heated annealing chamber can also be given thermal power by a segment of the primary collector and/or by radiant heat from the system to slow cooling of the part and prevent cracking.

The solar concentrator can be mobile and independent of its solar tracking and concentrating abilities. For example, it can be mounted on a mobile, cable-driven, or gantry system in order to translate across greater distances or traverse a surface or structure. This configuration may enable the solar concentrator unit to be deployed for heat treating a large surface or in-situ additive manufacturing of architectural structures, including but not limited to the 3D printing of large objects such that the mobile solar concentrator unit is carried by a mobile platform atop the structure, which it may be in the process of constructing.

In an example, precision tracking of the sun is based on a ring of sensors around the heated spot to rotate the primary collector if the concentrated spot strays from its intended target. This uses the refractive properties of the lens to assess the angle of incoming direct sunlight and reorient the primary collector towards the sun.

In an example, solar flux density may be rapidly adjusted at the receiver by dynamically adjusting the distance between the primary collector and the receiver to bring the concentrated spot in or out of focus. This is achieved by linear actuation of the primary collector relative to either a redirecting mirror or receiver, or linear actuation between redirecting mirror and receiver. Irradiance measurements at the concentrated spot may be used as feedback for these controls.

In an example, total power output is controlled by adjusting the shutter on the primary collector relying on sensor measurements of incoming direct solar irradiance and/or irradiance measurements near the heated spot to direct shutter actuation.

In an example, temperature is controlled at the receiver by dynamically adjusting energy flux density of the concentrated spot for fine temperature control. Temperature may also be controlled at the receiver by adjusting the total area of light collected through the shutter on the primary collector for gross temperature control.

In an example, the size and shape of the concentrated spot may be adjusted by incorporating an orifice or mechanical iris to block some light from reaching the receiver. This enables precision spatial application and high resolution control of the thermal energy.

In an example, the concentrated solar spot can be moved across a receiver plane (e.g., along a defined 2D path) while independently controlling solar flux density of the concentrated spot. This control is achieved by adjusting the path length of light from the primary collector to the receiver through linear translation of the primary collector, the redirecting mirror, or the receiver, and coordinating this translation with the rotation of the redirecting mirror.

It is noted that the examples shown and described are provided for purposes of illustration and are not intended to be limiting. Still other examples are also contemplated.

The invention claimed is:

1. A light concentrator system for precision thermal processes, comprising:
   a stabilizing base;
   a structure attached to the stabilizing base, the structure including support arms;
   an azimuth control for rotating the structure;
   a primary solar collector on the support arms, the primary solar collector rotatable about two axes based on various positions of the sun throughout the day;
   elevation actuators to adjust an angle of the primary solar collector relative to position of the sun;
   collector distancing actuators to adjust distance of the primary solar collector toward and away from the sun;
   a receiver plane;
   a redirecting mirror to beam a concentrated solar spot onto different locations of the receiver plane, the collector distancing actuators linearly adjusting the distance between the primary solar collector and the redirecting mirror, and the redirecting mirror rotating to translate the concentrated solar spot across the receiver plane, wherein positioning the collector distancing actuators independently controls energy flux density of the concentrated solar spot; and
   a variety of Thermal Processing Units (TPUs), each of the TPUs configured for a specific process or set of processes implementing the concentrated solar energy spot from the primary solar collector at the receiver plane.

2. The light concentrator system of claim 1, further comprising:
   a shutter before or after the primary solar collector to control aperture size and total flux of the concentrated solar energy; and
   an irradiance sensor to measure direct irradiance of incoming sunlight to inform adjustments of the shutter and maintain consistent power output independent of cloud cover, solar elevation, or other atmospheric effects.

3. The light concentrator system of claim 1, further comprising a compound parabolic concentrator or parabolic reflector for secondary concentration of light from the primary collector onto the receiver plane to achieve higher light concentration ratios and a smaller spot size while increasing uniformity of the solar flux density distribution profile.

4. The light concentrator system of claim 1, further comprising a compound parabolic concentrator configured with an inlet oriented at an angle for lower solar elevations and with an outlet oriented parallel to the receiver plane.

5. The light concentrator system of claim 1, further comprising a ring of sensors for relative measurements of irradiance and/or temperature, the ring positioned concentrically around the concentrated solar energy to sense misalignment between the primary solar collector and the incoming direct radiation to reorient the primary solar collector towards the sun.

6. The light concentrator system of claim 1, further comprising sensors placed on or near the primary solar collector to measure irradiance.

7. The light concentrator system of claim 6, wherein the collector distancing actuators make micromotion adjustments to a path distance between the primary solar collector and the receiver plane to control temperature.

8. The light concentrator system of claim 6, wherein the collector distancing actuators make dynamic adjustments to the distance between primary collector and the receiver plane to bring the concentrated spot in or out of focus on the receiver plane and control solar flux density of the concentrated solar energy and temperature at the receiver plane.

9. The light concentrator system of claim 1, wherein the receiver plane is translated to redistribute the concentrated solar energy for selective melting additive manufacturing.

10. The light concentrator system of claim 1, wherein linear actuation of the primary solar collector relative to the receiver plane provides fine temperature control at the receiver plane by adjusting energy flux density of a concentrated solar spot.

11. The light concentrator system of claim 1, wherein a compound parabolic concentrator configured as a secondary concentrator redirects light from an inclined solar elevation to an angle normal to the receiver plane.

12. The light concentrator system of claim 1, further comprising an orifice plate in a light path adjacent the receiver plane to provide high resolution spot size control.

13. The light concentrator system of claim 1, further comprising photodiodes for fine solar tracking and spot positioning.

14. The light concentrator system of claim 1, further comprising:
   a lens; and
   lens distancing actuators to translate the lens in two directions relative to the support arms to provide positioning of the spot on a receiver plane.

15. The light concentrator system of claim 1, further comprising a camera for measuring position and size of the solar spot.

16. The light concentrator system of claim 1, further comprising a powderbed, powder feedstock dispenser, and powder feed roller.

17. The light concentrator system of claim 1, further comprising a fused deposition modeling nozzle.

18. A light concentrator system for precision thermal processes, comprising:
   a stabilizing base;
   a structure attached to the stabilizing base, the structure including support arms;
   an azimuth control for rotating the structure;

a primary solar collector on the support arms, the primary solar collector rotatable about two axes based on various positions of the sun throughout the day;

elevation actuators to adjust an angle of the primary solar collector relative to position of the sun;

collector distancing actuators to adjust distance of the primary solar collector toward and away from the sun;

a receiver plane;

a redirecting mirror to beam a concentrated solar spot onto different locations of the receiver plane, the redirecting mirror rotating to translate the concentrated solar spot across the receiver plane, wherein positioning the collector distancing actuators independently controls energy flux density of the concentrated solar spot;

a shutter immediately before or after the primary solar collector to control aperture size and total flux of the concentrated solar energy at the receiver plane; and an irradiance sensor to measure direct irradiance of incoming sunlight to inform adjustments of the shutter and maintain consistent power output independent of cloud cover, solar elevation, or other atmospheric effects.

19. A light concentrator system for precision thermal processes, comprising:

a stabilizing base;

a structure attached to the stabilizing base, the structure including support arms;

an azimuth control for rotating the structure;

a primary solar collector on the support arms, the primary solar collector rotatable about two axes based on various positions of the sun throughout the day;

elevation actuators to adjust an angle of the primary solar collector relative to position of the sun;

collector distancing actuators to adjust distance of the primary solar collector toward and away from the sun;

a receiver plane;

a redirecting mirror to beam a concentrated solar spot onto different locations of the receiver plane, the redirecting mirror rotating to translate the concentrated solar spot across the receiver plane, wherein positioning the collector distancing actuators independently controls energy flux density of the concentrated solar spot; and a compound parabolic concentrator or parabolic reflector for secondary concentration of light from the primary collector onto the receiver plane to achieve higher light concentration ratios and a smaller spot size while increasing uniformity of the solar flux density distribution profile.

* * * * *